United States Patent
Honda et al.

(10) Patent No.: US 6,734,877 B1
(45) Date of Patent: May 11, 2004

(54) IMAGE DISPLAY APPARATUS AND METHOD

(75) Inventors: Fumitaka Honda, Chiba (JP); Koji Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/571,052

(22) Filed: May 15, 2000

Related U.S. Application Data

(63) Continuation of application No. PCT/JP98/04191, filed on Sep. 17, 1998.

(51) Int. Cl.$^7$ ................................................. G06F 3/00
(52) U.S. Cl. ........................ 345/721; 345/719; 345/716
(58) Field of Search ................................ 345/700, 716, 345/719, 720, 721, 722, 723, 738, 440, 649

(56) References Cited

U.S. PATENT DOCUMENTS

| | | | | |
|---|---|---|---|---|
| 5,437,464 A | * | 8/1995 | Terasima et al. | 463/43 |
| 5,559,949 A | * | 9/1996 | Reimer et al. | 345/720 |
| 5,819,103 A | * | 10/1998 | Endoh et al. | 710/1 |
| 5,963,203 A | * | 10/1999 | Goldberg et al. | 345/723 |
| 6,181,867 B1 | * | 1/2001 | Kenner et al. | 386/46 |
| 6,377,745 B2 | * | 4/2002 | Akiba et al. | 386/68 |

FOREIGN PATENT DOCUMENTS

| | | | | |
|---|---|---|---|---|
| JP | 6-086166 | * | 3/1994 | H04N/5/265 |
| JP | 9-312818 | | 12/1997 | |

OTHER PUBLICATIONS

Zhang et al., "An Integrated System for Content–Based Video Retrieval and Browsing", Pattern Recongnition, vol. 30, No. 4, pp. 643–658, Apr. 1997.

Muranoi et al., "Construction of Hierarchical Video Browser Using Extraction of Scene of Movie", Research Report of Information Processing Society of Japan, vol. 97, No. 89, pp. 29–34, Sep. 12, 1997.

Ohba et al., "Method of Dramaturgically Building Human Human Interface Environment", Research Report of Information Processing Society of Japan, vol. 92, No. 4, pp. 17–24, Jan. 14, 1993.

* cited by examiner

*Primary Examiner*—John Cabeca
*Assistant Examiner*—Kieu D. Vu
(74) *Attorney, Agent, or Firm*—Frommer Lawrence & Haug LLP; William S. Frommer; Darren M. Simon

(57) ABSTRACT

An index related process unit 75 in a web server 3 determines index related information regarding a display form of a VD index picture, which is necessary for a GUI data generating unit 77 to generate GUI data. The index related information includes, for example, the number of VD index pictures which can be displayed according to the size of a browser screen of a terminal device 4, numbers of VD index pictures to be selected when the number of VD index pictures generated exceeds the displayable number, and a VD index picture display form according to the length of a moving picture. The VD index picture display form is used so that the user of the terminal device 4 can recognize the length of the corresponding moving picture only by seeing the VD index picture display form displayed on the browser screen by selectively using a part of the area in which the VD index pictures can be displayed according to the length of the moving picture.

12 Claims, 12 Drawing Sheets

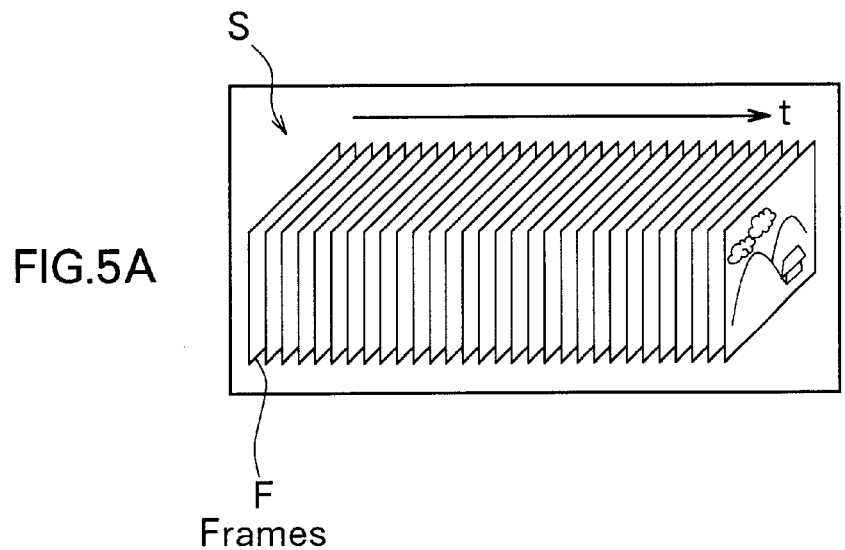
FIG.5A
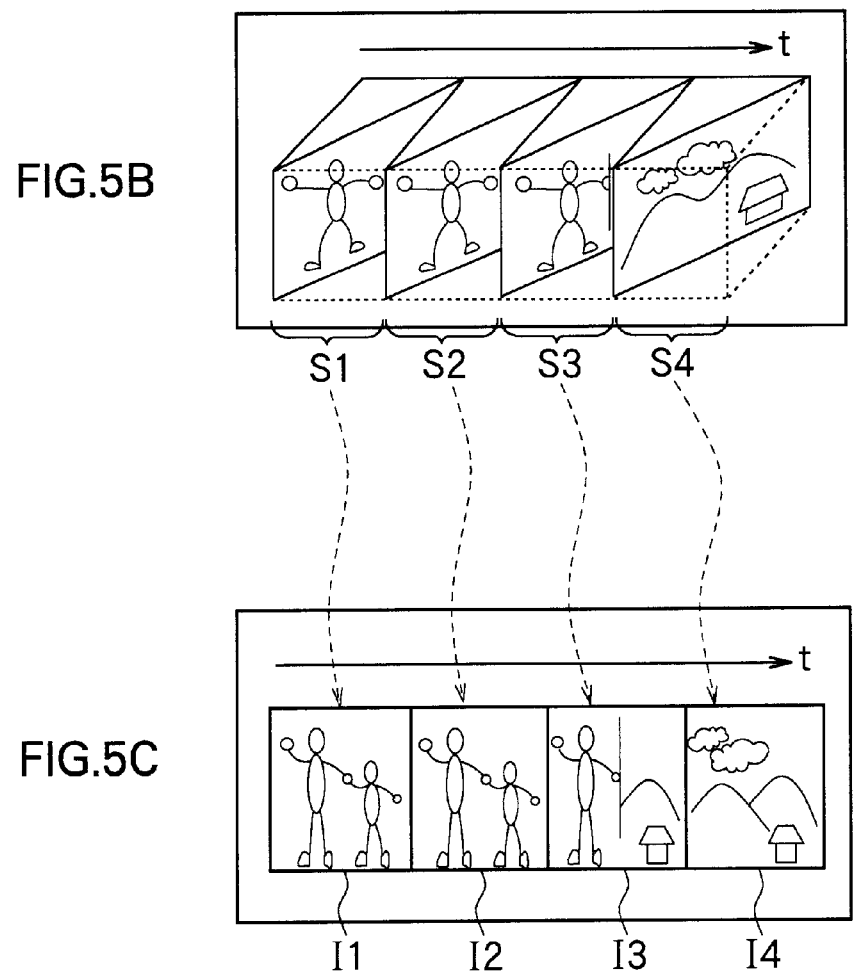
FIG.5B
FIG.5C

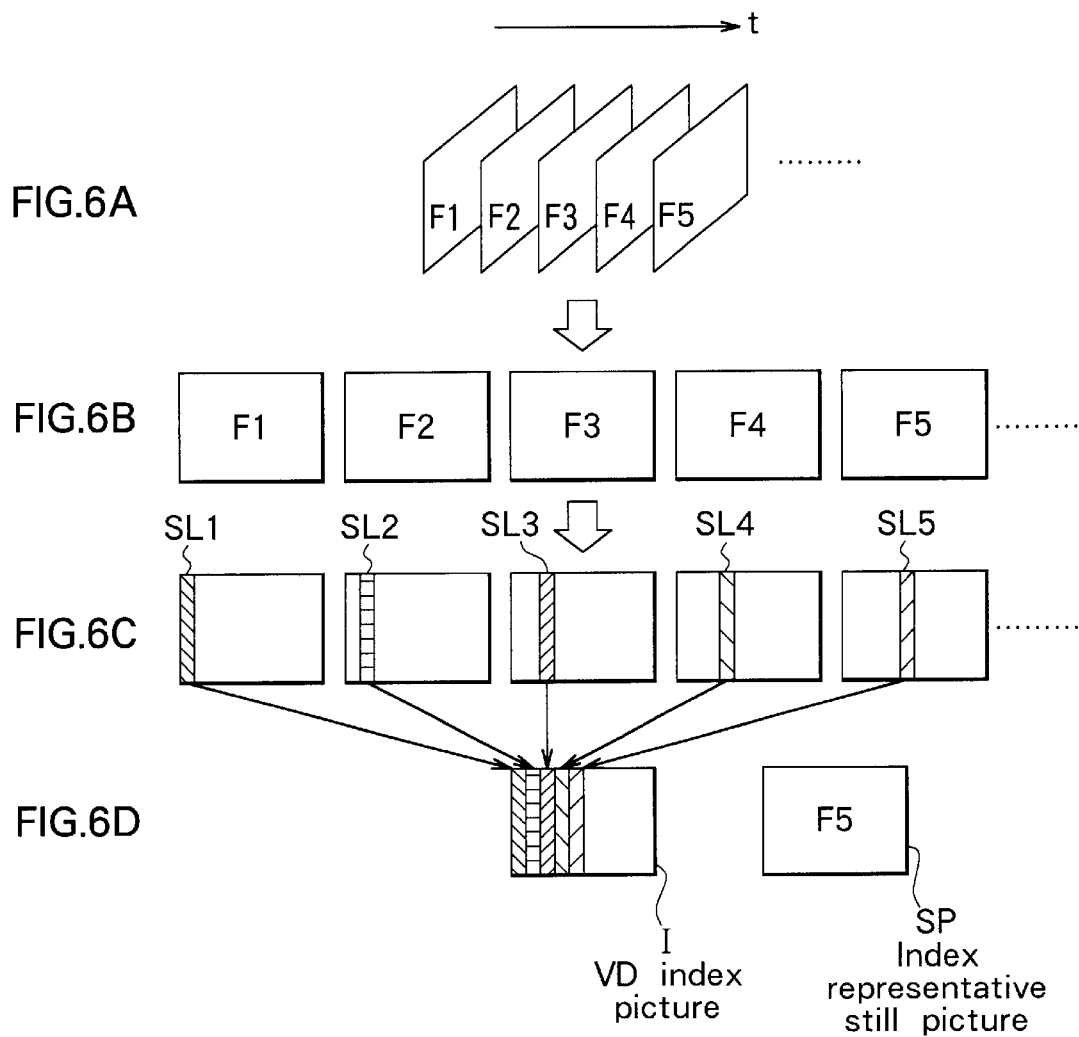

| Database server | Web server | Terminal device |
|---|---|---|
| | determine the number of VD index pictures to be displayed on browser screen on the basis of information indicative of the size of browser screen and information of length of moving picture (S13) | |
| | selectively determine numbers of VD index pictures to be actually displayed by using predetermined function in accordance with the number of VD index pictures to be displayed on browser screen (S14) | |
| | transfer information of determined numbers of VD index pictures to be actually displayed to GUI data generating unit (S15) | |
| | generate GUI data on the basis of retrieval result from database server, retrieval result from index storing unit, and information of determined numbers of VD index pictures to be actually displayed (S16) | |
| | transmit GUI data as retrieval result to terminal device (S17) | display GUI data on browser (S18) |
| | | transmit information indicative of change in size of browser screen to web server in the case of changing size of browser screen (S19) |
| | repeat process of displaying index pictures (S20) | |

FIG.8

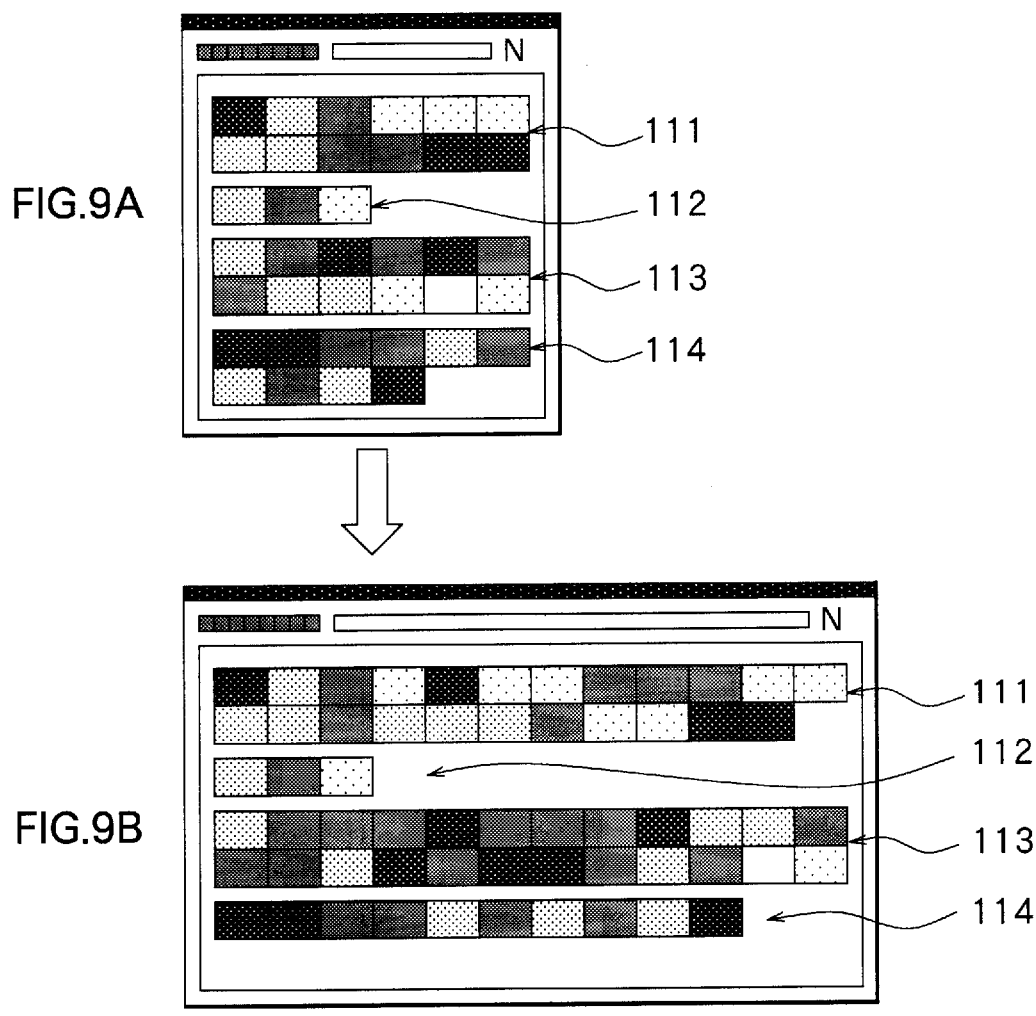
FIG.9A
FIG.9B
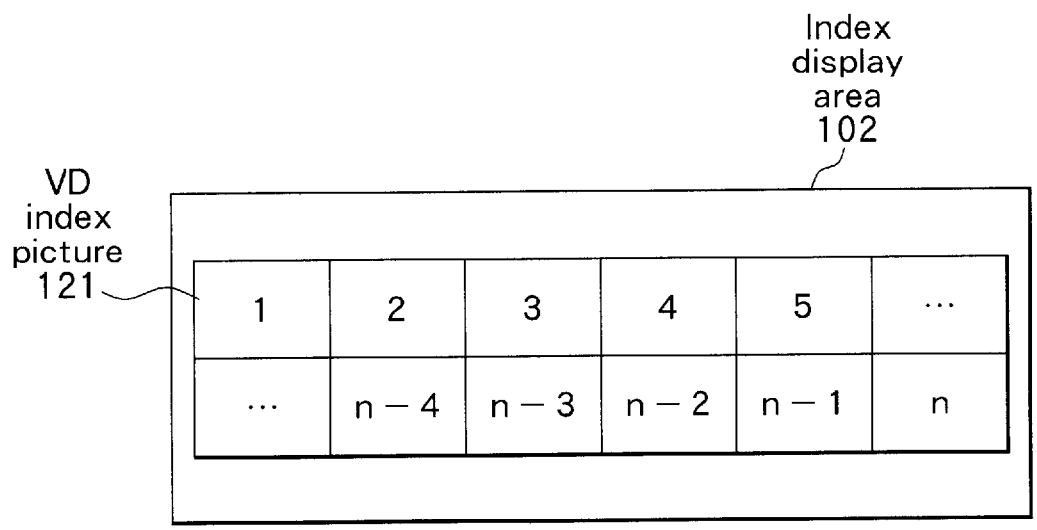
FIG.10

IMAGE DISPLAY APPARATUS AND METHOD

This is a continuation of copending International Application PCT/JP98/04191 having an international filing date of Sep. 17, 1998.

TECHNICAL FIELD

The present invention relates to an image display apparatus capable of displaying an outline of a moving picture as a still picture. For example, the invention relates to an image display apparatus applied to a system of retrieving a desired moving picture from a plurality of kinds of moving pictures.

BACKGROUND ART

Conventionally, an information retrieving technique intended for characters is widely used. However, with respect to a retrieving technique intended for video image, there are few realized examples and various attempts are still being made at present. Among them, moving picture retrieving methods such as a method using an image recognizing technique, a method using a scene extracting technique, and the like have been being studied from various viewpoints.

For example, in a VOD (Video On Demand) system in which a moving picture server and a database server are combined, the contents (of the moving picture) can be retrieved by a keyword retrieval of a title name or the like, The title name, however, does not always properly express the contents. Under the present circumstances, in many cases, the contents can be recognized as a result from playing them back.

In order to solve the problem, as disclosed in Japanese Unexamined Patent Application No. 2-260075, the applicant of the invention has proposed a video browser technique with a view to showing a moving picture so as to be recognized at sight. According to the video browser technique, index picutres as so-called digest still pictures are generated on the basis of partial picutres sampled from each of a series of still pictures which form a moving picture through a moving slit window and are listed in accordance with the time, thereby enabling the outline contents of the moving picture to be recognized at a glance.

According to the video browser technique, since the contents of a moving picture of an enormous amount recorded in an invisible state are displayed in the form of still pictures compressed according to the time, the contents of the moving picture can be immediately grasped.

Examples of a method of displaying the index pictures include a method of displaying all the generated index pictures and a method of sequentially displaying only a predetermined number of index pictures among the generated index pictures in accordance with the order from the head index picture.

However, In the case of the method of displaying all the generated index pictures, for example, when the number of generated index pictures is large, all of the index pictures are not displayed within a screen depending on the display environment (size of the screen or the like) and there is accordingly the possibility that the moving picture cannot be efficiently viewed.

In the case of the method of displaying only a predetermined number of index pictures in accordance with the order from the head index picture, since the predetermined number of index pictures are always displayed, there is the possibility that the index pictures cannot be displayed on a screen at once, or that a vein space in which no index picture is displayed occurs depending on the display environment. In this case, even when the size of the screen can be changed, only a fixed number of index pictures are displayed. Consequently, the pictures are not properly displayed according to the display environment.

Further, in the case of the method of sequentially displaying a fixed number of index pictures from the head, for example, when the moving picture is of a long time, only the head portion of all the generated index pictures can be seen. Consequently, there is a problem such that the whole moving picture cannot be checked.

As for the method of displaying all the generated index pictures, the length of the moving picture can be grasped roughly from the number of displayed index pictures. As opposed to it, in the case of the method of displaying only the predetermined number of index images, there is a problem such that the length of the moving picture cannot be determined.

DISCLOSURE OF INVENTION

The invention has been achieved in consideration of the problems and its object is to provide a picture display apparatus and method capable of properly displaying an index picture generated by a video browser technique in accordance with the display environment, the contents of a moving picture, and the like.

A picture display apparatus of the invention comprises: index picture holding means for holding an index image generated by summarizing a moving picture as a still picture on the basis of a plurality of still pictures arranged in time sequence so as to construct a moving picture; display means for displaying the index picture held by the index picture holding means; and display form determining means for determining a display form of the index picture displayed on the display means in accordance with at least either display environment of the display means or the contents of the moving picture.

A picture displaying method of the invention comprises the steps of: holding an index picture generated by summarizing a moving picture as a still picture on the basis of a plurality of still pictures arranged in time sequence so as to construct a moving picture; and determining a display form of the index picture to be displayed on display means in accordance with at least either display environment of the display means for displaying the held index picture or the contents of the moving image.

In the picture display apparatus and method of the invention, the index picture generated by summarizing the moving picture as a still picture on the basis of the plurality of still pictures arranged in time sequence so as to construct a moving picture, and a display form of the index pictures to be displayed on display means is determined according to at least either the display environment of the display means for displaying the held index image or the contents of the moving picture.

Other and further objects, features and advantages of the invention will appear more fully from the following description.

BRIEF DESCRIPTION OF DRAWINGS

FIGS. 5A to 5C are explanatory diagrams showing the schematic procedure of generating a plurality of VD index pictures from a series of moving pictures.

FIGS. 6A to 6D are explanatory diagrams showing a procedure of generating one VD index picture from moving pictures in a section.

FIG. 8 is a flowchart continued from FIG. 7.

FIGS. 9A and 9B are explanatory diagrams showing a method of displaying VD index pictures according to the size of the Internet browser screen.

FIG. 10 is an explanatory diagram showing a method of displaying VD index pictures according to the length of a moving picture.

BEST MODE FOR CARRYING OUT THE INVENTION

Figure 1:
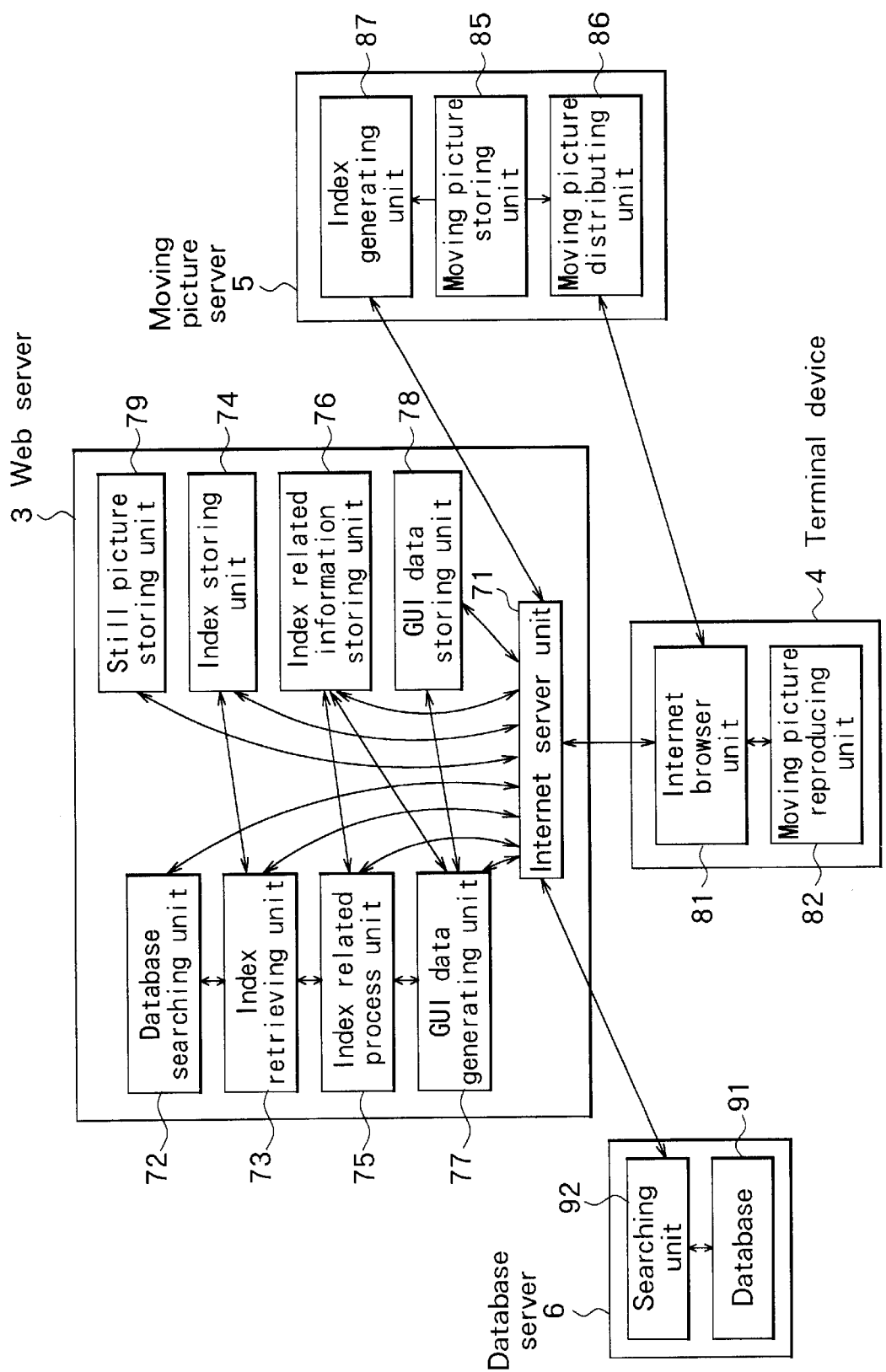
FIG. 1 is a block diagram showing the functional configuration of components in a moving picture retrieving and distributing system to which a picture display apparatus of an embodiment of the invention is applied.

Embodiments of the invention will be described in detail hereinbelow by referring to the drawings.

Figure 2:
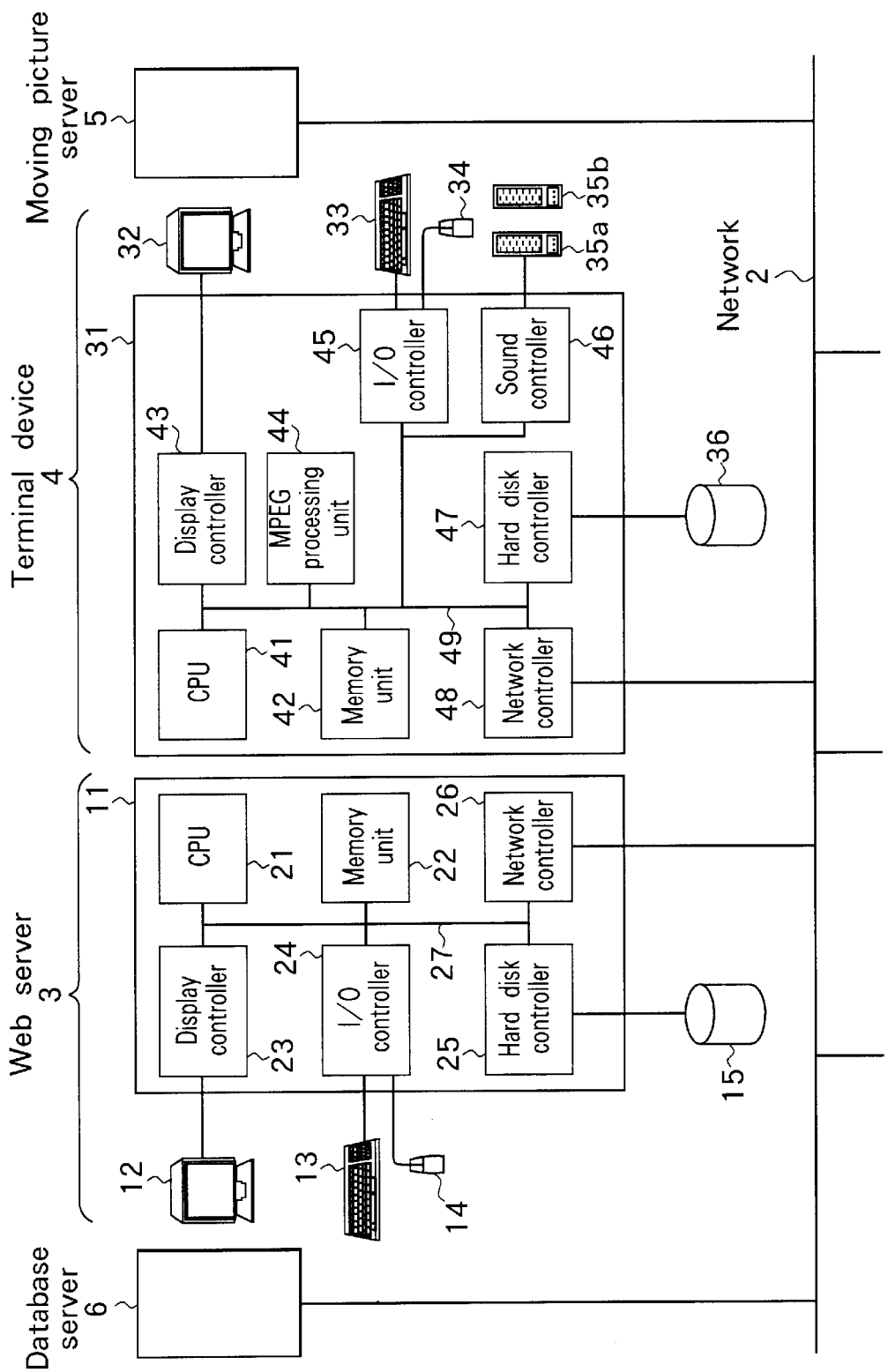
FIG. 2 is a block diagram showing the hardware configuration of the moving picture retrieving and distributing system in conjunction with an internal configuration of a web server and a terminal device as components of the system.

FIG. 2 shows a hardware configuration of a moving picture retrieving and distributing system to which a picture display apparatus according to an embodiment of the invention is applied together with internal configurations of a web server 3 and a terminal device 4 as components of the system. The moving picture retrieving and distributing system of the embodiment is a system capable of retrieving and distributing a moving picture by using the world wide web (WWW) as a system which makes an access to information on the Internet possible.

As shown in the diagram, the moving picture retrieving and distributing system comprises the web server 3 for supporting the WWW, the terminal device 4 as a client, a moving picture server 5 for storing a moving picture, and a database server 6 for storing data which is related to the moving picture stored in the moving picture server 5. Each of the components is connected to a network 2 as a part of the Internet. The number of each of the web server 3, terminal device 4, moving picture server 5 and database server 6, connected to the network 2, and the physical connection form of the components to the network 2 are not especially limited.

The web server 3 mainly retrieves a moving picture or retrieves and distributes visual digest index pictures (hereinbelow, referred to as VD index pictures) as still pictures generated from a moving picture in accordance with a request from the terminal device 4. The VD index pictures are obtained by summarizing the contents of the moving picture in the form of still pictures. Only by seeing the VD index pictures, the rough contents of the moving picture can be grasped. The generating method will be described hereinlater. The VD index picture corresponds to an example of an "index picture" in the invention.

As shown in FIG. 2, the web server 3 comprises a computer unit 11, and a display apparatus 12, a keyboard 13, a mouse 14 and a hard disk drive 15, which are connected to the computer unit 11. The computer unit 11 comprises a CPU (central processing unit) 21, a memory unit 22 including a ROM (read only memory) and a RAM (random access memory), a display controller 23 for controlling the display apparatus 12, an I/O controller 24 connected to the keyboard 13 and the mouse 14, for controlling an input/output (I/O) operation, a hard disk controller 25 for controlling the hard disk drive 15, and a network controller 26 connected to the network 2, for controlling communications. The components are connected to each other via a bus 27. The CPU 21 executes an application program stored in the hard disk drive 15 by using the RAM in the memory unit 22 as a working memory area.

The terminal device 4 is an ordinary personal computer for example, and has an Internet browser as software which makes information on the Internet browsable and a moving picture reproducing program as software for enabling the moving picture distributed via the network 2 to be reproduced. As the Internet browser, for instance, a general commercial browser such as Netscape Navigator (trademark of Netscape Communications, U.S.A.) can be used.

As shown in FIG. 2, the terminal device 4 comprises a computer unit 31, and a display apparatus 32, a keyboard 33, a mouse 34, speakers 35a and 35b, and a hard disk drive 36, which are connected to the computer body 31. The computer body 31 comprises: a CPU 41; a memory unit 42 including a ROM, a RAM, and the like; a display controller 43 for controlling the display apparatus 32; an MPEG processing unit 44 for compressing and decompressing image data in compliance with the MPEG (Moving Picture Experts Group) standard; an I/O controller 45 connected to the keyboard 33 and the mouse 34, for controlling an input/output operation; a sound controller 46 for controlling sound outputs from the speakers 35a and 35b; a hard disk controller 47 for controlling the hard disk drive 36; and a network controller 48 connected to the network 2, for controlling communications. The components are connected to each other via a bus 49. The CPU 41 executes an application program stored in the hard disk drive 36 by using the RAM in the memory unit 42 as a working memory area. The MPEG processing unit 44 can be realized by either hardware or software.

As long as the Internet browser function and the moving image reproducing function as described above are provided, the terminal device 4 is not limited to certain hardware configuration.

The moving picture server 5 stores a plurality of kinds of moving pictures, provides the moving picture via the network 2 in response to a request, and generates a VD index picture from a moving picture.

Figure 3:
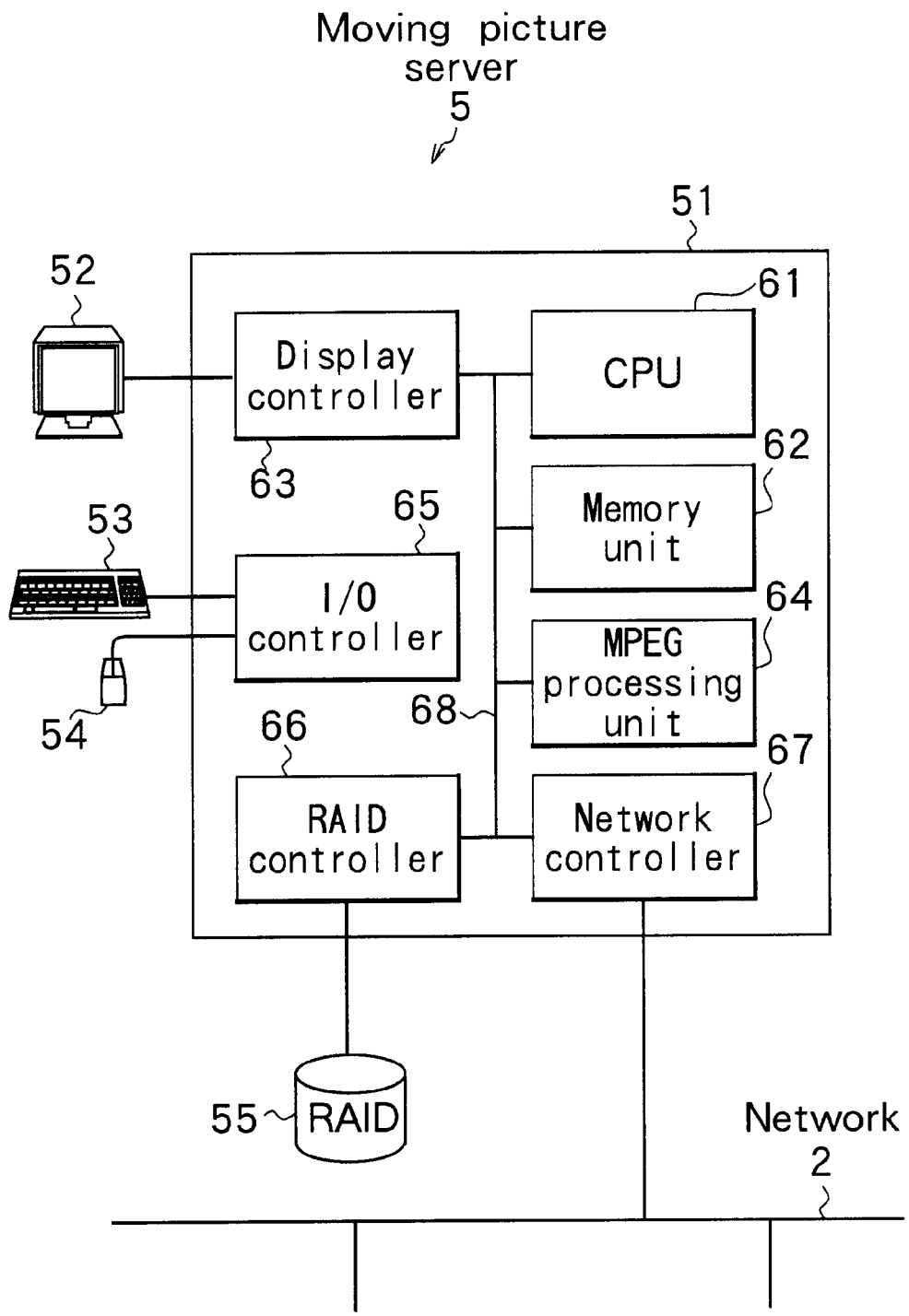
FIG. 3 is a block diagram showing a hardware configuration of a moving picture server.

FIG. 3 shows the hardware configuration of the moving picture server 5. As shown in the diagram, the moving picture server 5 comprises a computer unit 51, and a display apparatus 52, a keyboard 53, a mouse 54, and a RAID (Redundant Array of Inexpensive Disks) 55 of a large capacity redundantly constructed by using a plurality of hard disks, which are connected to the computer unit 51.

The computer unit 51 comprises: a CPU 61; a memory unit 62 including a ROM, a RAM, and the like; a display controller 63 for controlling the display apparatus 52; an MPEG processing unit 64 for compressing and decompressing image data in compliance with the MPEG standard; an I/O controller 65 connected to the keyboard 53 and the mouse 54, for controlling an input/output operation; a RAID controller 66 for controlling the RAID 55; and a network controller 67 connected to the network 2, for controlling communications. The components are connected to each other via a bus 68. The CPU 61 executes an application program stored in the RAID 55 by using the RAM in the memory unit 62 as a working memory area. The MPEG processing unit 64 may be realized by hardware or software.

The functional configuration of the moving picture retrieving and distributing system of the embodiment will now be described.

FIG. 1 shows the functional configuration of components in the moving picture retrieving and distributing system shown in FIG. 2. As shown in the diagram, the web server 3 has an Internet server unit 71, a database searching unit 72, an index retrieving unit 73, an index storing unit 74, an index related process unit 75, an index related information storing unit 76, a GUI (Graphycal User Interface) data generating unit 77, a GUI data storing unit 78, and a still picture storing unit 79.

The Internet server unit 71 is used to, for instance, manage and distribute information to be made public on the Internet. Specifically, the Internet server unit 71 transmits/receives signals to/from the terminal device 4, the moving picture server 5, the database server 6 and the like.

The database searching unit 72 performs processes of generating a moving picture retrieval request to the database server 6 in accordance with a request from the terminal device 4 and transferring the obtained retrieval result to the index retrieving unit 73. The retrieval result includes the title of the corresponding moving picture, the file name of moving image data, the name of the moving picture server in which the moving picture file is stored (the moving picture server 5 in this case), and a storage position of the moving picture file in the moving picture server. The retrieval result also includes information of the length of the corresponding moving picture.

The index retrieving unit 73 retrieves a target file from the plurality of VD index files stored in the index storing unit 74 on the basis of the database search result received from the database searching unit 72. As will be described hereinlater, the VD index file is an image data file generated every title of a moving picture and includes one or a plurality of VD index image data.

The index storing unit 74 stores the VD index file sent from the moving picture server 5.

The index related process unit 75 performs a process of determining a display form of the VD index pictures, necessary for the GUI data generating unit 77 to generate GUI data. The index related process unit 75 determines, for example, the number of displayable VD index pictures according to the size of the Internet browser screen (hereinbelow, simply called a browser screen) of the display apparatus 32 of the terminal device 4, numbers of the VD index pictures to be selected when the number of generated VD index pictures exceeds the number of displayable pictures, a display form of the VD index pictures according to the length of the moving picture, and the like. The VD index picture display form is used so that the user of the terminal device 4 can recognize the length of the corresponding moving picture only by seeing the VD index picture display form displayed on the browser screen of the display apparatus 32, by selectively using a part of the area in which the VD index pictures can be displayed according to the length of the moving image.

The index related process unit 75 corresponds to an example of display form determining means in the invention.

The index related information storing unit 76 stores index related information which will be described hereinlater and which is generated by an index generating unit 87 in the moving picture server 5.

The GUI data generating unit 77 generates or updates GUI data constituting a homepage for moving picture retrieval provided to the terminal device 4 or the like. The data used to make the homepage for moving picture retrieval is usually described in HTML (Hyper Text Markup Language).

The GUI data storing unit 78 is an area for storing the GUI data generated by the GUI data generating unit 77.

The still picture storing unit 79 stores a still picture file sent together with the VD index file from the moving picture server 5. The still picture file is made by data of still pictures each of which is made associated with each of VD index pictures included in the VD index file. As the still picture data, for example, data compressed in the GIF (Graphics Interchange Format) is employed.

Among the functional units in the web server 3, the Internet server unit 71, database searching unit 72, index retrieving unit 73, index related process unit 75, and GUI data generating unit 77 are realized mainly by an application program stored in the hard disk drive 15 and the CPU 21 for executing the application program in FIG. 2. Each of the index storing unit 74, index related information storing unit 76, GUI data storing unit 78, and still picture storing unit 79 is realized by using a part of 15 in FIG. 2.

The terminal device 4 has an Internet browser unit 81 and a moving picture reproducing unit 82.

The Internet browser unit 81 has a function of accessing the Internet by using the WWW and receiving and displaying information. As mentioned above, it is realized by a general commercial browser such as the Netscape Navigator.

The moving picture reproducing unit 82 decompresses the moving image data distributed from the moving picture server 5 and displays the decompressed picture. The moving picture reproducing unit 82 is mainly realized by the MPEG processing unit 44 in FIG. 2. The function of the moving picture reproducing unit 82 can be also realized by a program for reproducing a moving image adapted to the contents type (for example, compression method) of the moving picture. The program for reproducing a moving picture is provided as, for example, plug-in software of the Internet browser.

The moving picture server 5 has a moving picture storing unit 85, a moving picture distributing unit 86 and the index generating unit 87.

The moving picture storing unit 85 is a part for storing a moving picture file and is realized by the RAID 55 in FIG. 3. The moving image data included in the moving image file is compressed in the MPEG format.

The moving picture distributing unit 86 takes a target moving image from the moving picture storing unit 85 in response to a request from the terminal device 4 or the like and distributes the target moving picture to the terminal device 4 via the network 2.

The index generating unit 87 performs a process of generating VD index pictures as still pictures by visually summarizing the contents of the moving picture stored in the moving picture storing unit 85 and transmitting the VD index pictures as a VD index file to the web server 3 through the network 2. Specifically, the moving picture read from the moving image storing unit 85 is decompressed by the MPEG processing unit 64 (FIG. 3) and processes which will be described hereinlater (refer to FIGS. 5A to 5C and FIGS. 6A to 6D) are performed on the decompressed moving picture, thereby generating the VD index pictures. The VD index file is stored in the index storing unit 74 in the web server 3.

The index generating unit 87 generates various parameter information (hereinbelow, called index related information) associated with the generation of the VD index images. The index related information includes the total number of generated VD index pictures and various parameter information necessary to generation of the VD index pictures such as the number of frames used to generate a VD index picture and the number of lines in one frame to obtain slit picture information.

The index holding unit 74 corresponds to an example of "index image holding means" in the invention.

The database server 6 has a database 91 and a searching unit 92.

The database 91 includes the title of a moving picture, the file name of the moving picture, the name of a moving picture server storing the moving picture file (in this case, the moving picture server 5), and the storing position of the moving picture file in the moving picture server. The database 91 includes information of the length of the moving picture.

The searching unit 92 searches the database 91 on the basis of a given keyword in response to a request from the database searching unit 72 in the web server 3 and transmits the search result to the database searching unit 72. The searching unit 92 is realized by, for example, a Database Management System (DBMS) program such as Sybase (trademark of Sybase Inc., U.S.A.).

Figure 4:
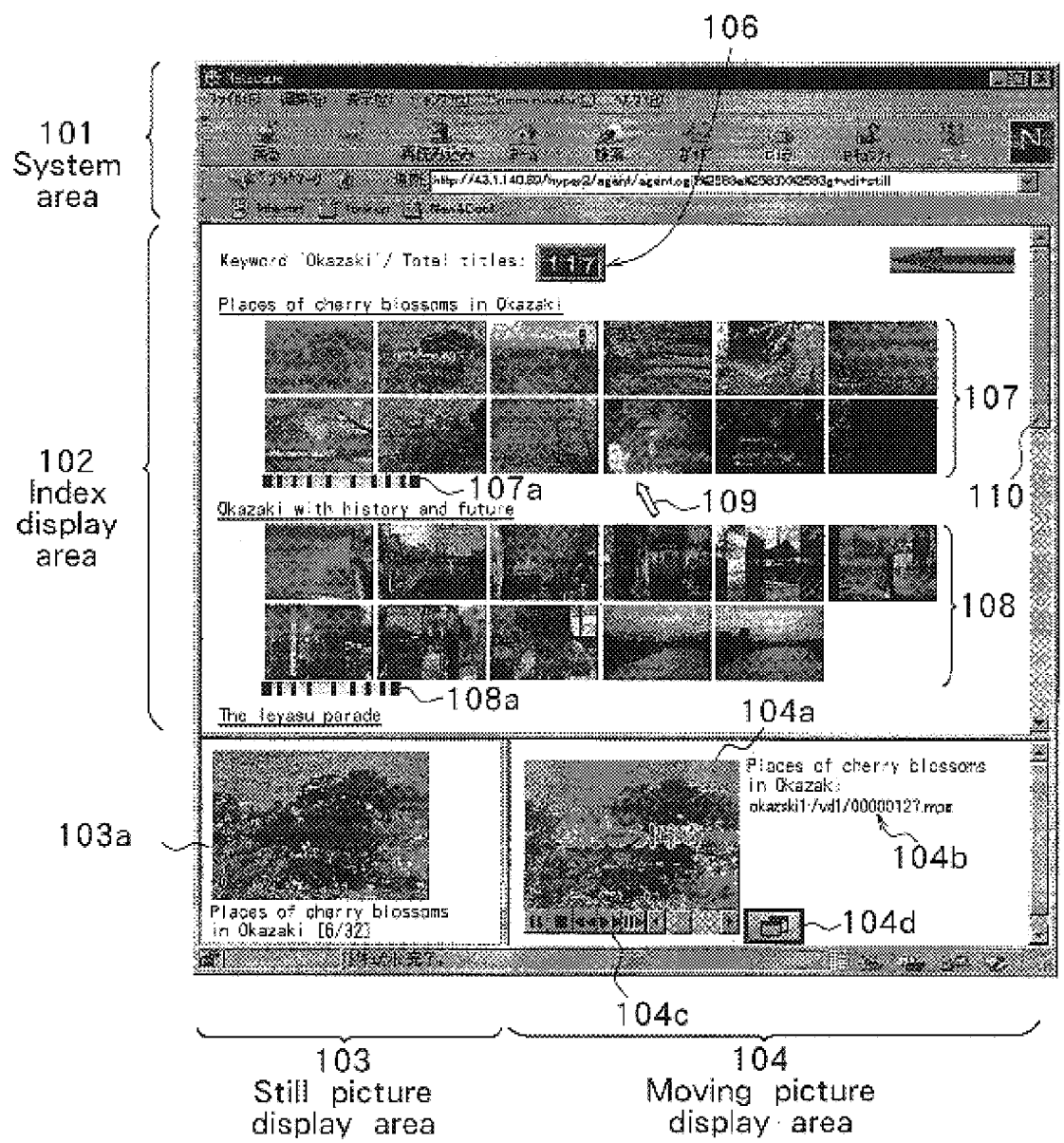
FIG. 4 is a diagram showing an example of an Internet browser screen displayed on a display apparatus of the terminal device.

FIG. 4 shows an example of the browser screen displayed on the display apparatus 32 of the terminal device 4. The browser screen is realized by the function of the Internet browser unit 81. Mainly, the display apparatus 32 corresponds to an example of "display means" in the invention.

The browser screen includes a system area 101 comprising a browser title bar, a menu bar, a tool bar and so on, an index display area 102 for displaying the VD index pictures as the retrieval result and the like, a still picture display area 103 for displaying a still picture, and a moving picture display area 104 for reproducing and displaying a moving picture.

The menu bar in the system area 101 has menu items such as "file", "edit", "display", and so on. Clicking a menu item with mouse, a pull-down menu is displayed. In the tool bar, tool icons such as "back" and "refresh" are arranged. Clicking a tool icon with mouse, a corresponding browser operation is performed. The mouse click denotes that, for example, the left button of the mouse 34 is clicked in a state where a mouse pointer 109 is on the target item. In the following description, the operation will be simply described as a click.

In the index display area 102, the keyword used for retrieval, the number 106 of titles of the moving pictures retrieved, VD index pictures 107 and 108 of the retrieved moving pictures, and the like are displayed. In the example shown in the diagram, 117 moving pictures are retrieved for the keyword 'Okazaki'. Among them, the VD index picture groups 107 and 108 of the moving pictures of the titles of 'places of cherry blossoms in Okazaki' and 'Okazaki with history and future' are displayed. One VD index picture group corresponds to the moving pictures of one title. Indicator bars 107a and 108a each corresponding to the length of all the corresponding moving pictures (total reproduction time) are disposed below the VD index picture groups. Black parts in the indicator bars 107a, 108a, and the like indicate the position of the VD index pictures displayed above in all the VD index pictures. In the index display area 102, by operating a scroll bar 110 at the right end, a plurality of VD index image groups are scrolled in the vertical direction and sequentially displayed.

In the still picture display area 103, a still picture 103a corresponding to the selected one of the VD index pictures displayed in the index display area 102 is displayed. The still picture 103a is an index representative still picture which will be described hereinlater. In the embodiment, for example, only by moving the mouse pointer 109 onto a desired VD index image by operating the mouse 34, the VD index picture is selected.

In the moving picture display area 104, a moving picture 104a corresponding to the selected one of the VD index pictures displayed in the index display area 102 is displayed together with the title name and a moving picture file name 104b. In the embodiment, for example, by moving the mouse pointer 109 on a desired VD index picture and clicking the mouse button, the moving picture corresponding to the VD index picture is selected. The reproduction start point in this case is the head of a moving image period corresponding to the clicked VD index picture. Alternatively, any point except for the head of the moving picture period can be the reproduction start point. Operations of reproduction, stop, temporarily stop, high-speed reproduction, reverse reproduction, high-speed reverse reproduction, and the like of the moving picture 104a can be performed by an operation unit 104c. By clicking an icon 104d, the enlarged moving picture 104a can be displayed on the browser screen.

The operation of the moving picture retrieving and distributing system with the configuration will now be described.

Referring to FIGS. 5A to 5C and FIGS. 6A to 6C, first, the VD index picture generating process performed by the index generating unit 87 in the moving picture server 5 will be described. FIGS. 5A to 5C show a rough procedure of generating a plurality of VD index pictures from a moving picture. FIGS. 6A to 6C show a procedure of generating one VD index picture from a moving picture in a certain period.

As shown in FIGS. 5A and 6A, a moving picture is defined as a rectangular parallelopiped model in which two-dimensional still pictures Fi (i=1, 2, . . . ) are arranged along the time axis (t). Hereinafter, the two-dimensional still picture will be also called a frame. For example, in the case of the NTSC (National Television System Committee) system, each frame is comprised of two fields each having a length of $\frac{1}{60}$ second, so that one frame has a length of $\frac{1}{30}$ second.

As shown in FIG. 5B, the rectangular parallelopiped model formed by a series of moving pictures is divided into a plurality of block rectangular parallelepipeds Si (in the diagram, i=1 to 4) at predetermined time intervals. Each block rectangular parallelopiped is cut diagonally along its diagonal face and picture information in a slit on each section face (hereinbelow, called slit picture information) is extracted. In practice, as shown in FIG. 6B, frames Fj (j=1, 2, . . . ) are extracted from one block rectangular parallelopiped. Further, as shown in FIG. 6C, slit picture information SLj is sequentially cut from the frames Fj by using a moving slit window which moves with time.

As shown in FIG. 6D, the slit picture information SLi extracted from the sections is sequentially arranged up to a predetermined size and is subjected to a predetermined compressing process. As shown in FIG. 5C, one VD index picture Ii (i=1 to 4) is consequently generated from a block rectangular parallelopiped Si and a plurality (four in the diagram) of VD index pictures are generated as a whole moving picture. At this time, one complete still picture included in the original block rectangular parallelopiped Si (that is, the original still picture which has not been subjected to the extracting process with the slit window) is correlated with each VD index picture and is registered as an index representative still picture. As the index representative still picture, for example, a still picture provided to generate the center part of the VD index image is selected. The still picture provided to generate another part (such as an end part) of the VD index picture may be also selected.

In the example shown in FIGS. 5A to 5C and FIGS. 6A to 6C, the slit picture information SLi is extracted from the still pictures constructing the moving picture by using the moving slit window elongated in the perpendicular direction (vertical direction). The slit picture information SLi may be also extracted by a moving slit window elongated in the horizontal direction (lateral direction). The slit picture information SLi may not be directly extracted from the still pictures Fi constructing the moving picture. It is also possible to set only a main part (for example, a central area) in the still pictures Fi as a range to be extracted and to put the other area (for example, peripheral areas) out of the object to be extracted. Further, original complete still pictures may be mixed in the VD index pictures aside from the index representative still picture.

Figure 7:
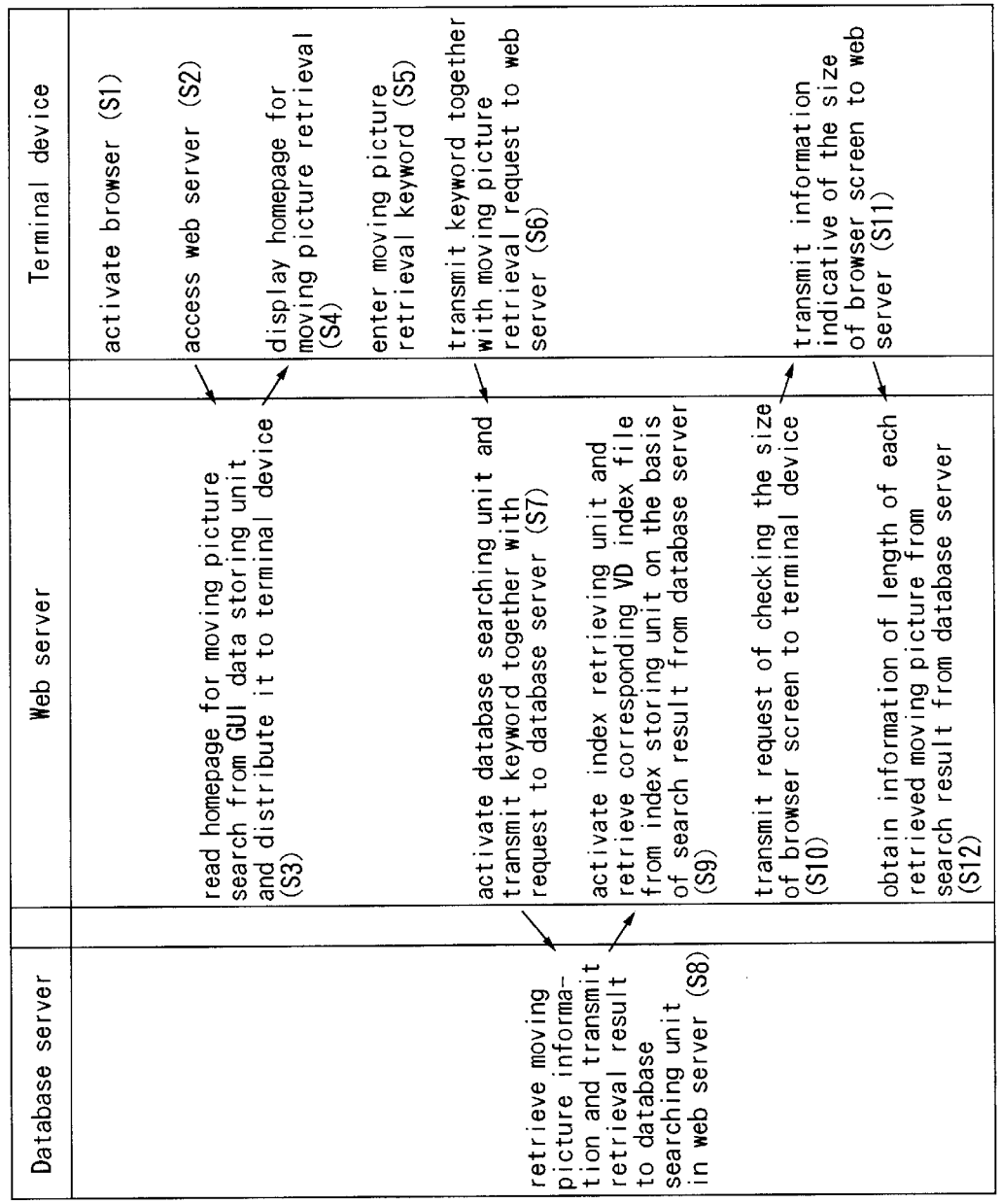
FIG. 7 is a flowchart showing a series of moving picture retrieving and distributing operations in each of the terminal device, a web server, and a data server.

Referring to FIGS. 7 and 8, the operation of the whole of moving picture retrieving and distributing system with the above configuration will now be described. FIGS. 7 and 8 show the series of operations in each of the terminal device 4, the web serve 3, and the database server 6. The operation in the case of retrieving the VD index picture of the corresponding moving picture by the web server 3 and the database server 6 in response to a retrieval request from the terminal device 4 and displaying the retrieved VD index picture on the browser of the terminal device 4 will be described. It is assumed that the VD index pictures of the moving picture stored in the moving picture storing unit 85 in the moving picture server 5 have been already stored in the index storing unit 74 in the web server 3.

When the Internet browser unit 81 is activated in the terminal device 4 (S1 in FIG. 7), the Internet browser unit 81 accesses the web server 3 via the network 2 (S2). The Internet server unit 71 in the web server 3 reads the GUI data used to describe the homepage for moving picture retrieval from the GUI data storing unit 78 and distributes the read GUI data to the terminal device 4 (S3).

The Internet browser unit 81 in the terminal unit 4 displays an initial screen (not shown) of the homepage for moving picture retrieval on the browser screen of the display apparatus 32 (FIG. 2) on the basis of the GUI data sent from the web server 3 (S4).

When a moving image retrieval keyword (hereinbelow, simply called a keyword) is entered (S5), the Internet browser unit 81 transmits the entered keyword together with the moving image retrieval request to the web server (S6).

Upon receipt of the moving picture retrieval request and the keyword from the terminal device 4, the Internet server unit 71 in the web server 3 starts the database searching unit 72. The database searching unit 72 transmits a moving picture retrieval command code together with the keyword to the database server 6 via the Internet server unit 71 and the network 2 (S7).

The searching unit 92 in the database server 6 searches the database 91 on the basis of the received keyword and transmits the retrieval result to the web server 3 (S8).

The web server 3 which has received the search result from the database server 6 starts the index retrieving unit 73. The index retrieving unit 73 retrieves the corresponding VD index file from the index storing unit 74 on the basis of the search result from the database server 6 (S9) and transfers the VD index file to the GUI data generating unit 77.

The index related process unit 75 in the web server 3 transmits a request of checking the size of the browser screen displayed on the display apparatus 32 to the terminal device 4 by the function of the Internet browser unit 81 in the terminal device 4 (S10). On receipt of the request of checking the size of the browser screen, the terminal device 4 transmits information of the size of the browser screen to the web server 3 (S11).

The index related process unit 75 obtains the information of the length of each of the retrieved moving images from the search result from the database server 6 (S12). On the basis of the information of the size of the browser screen and the information of the length of the moving picture, the index related process unit 75 determines the number of VD index pictures to be displayed on the browser screen (S13).

The index related process unit 75 selects and determines the numbers of the VD index pictures to be actually displayed by using a predetermined function which will be described hereinlater in accordance with the number of VD index pictures to be displayed on the browser screen (S14). Then the index related process unit 75 sends information of the determined numbers of the VD index pictures to be actually displayed to the GUI data generating unit 77 (S15).

The GUI data generating unit 77 generates the GUI data on the basis of the search result of the database server 6, the result of searching the index storing unit 74 and the information of the numbers of the VD index pictures to be actually displayed and determined by the index related process unit 75 (S16). The GUI data includes the title name of the moving picture, the moving picture file name, the storage place of the moving picture file in the moving picture server 5, and the VD index picture. The GUI data generating unit 77 stores the generated GUI data into the GUI data storing unit 78 and transmits it as a retrieval result to the terminal device 4 (S17).

The Internet browser unit 81 in the terminal device 4 receives the GUI data sent from the web server 3 and, on the basis of the data, as shown in FIG. 4, displays the keyword, the number 106 of corresponding moving pictures, the title names of the moving pictures, and the VD index picture groups 107 and 108 as the contents of the retrieval result in the index display area 102 on the retrieval result display screen (S18).

When the size of the browser screen is changed, the terminal device 4 transmits information indicative of the change in the size of the browser screen to the web server 3 (S19).

When the size of the browser screen is changed by the terminal device 4, the web server 3 repeats the index picture displaying processes (processes in S10 and subsequent steps) (S20). As described above, when the size of the browser screen is changed in the terminal device 4, the processes of displaying the index pictures are performed again. Consequently, the VD index picture can be displayed always in an optimum state in accordance with the size of the browser screen.

The method of controlling the display form of the VD index picture in the embodiment will now be described in detail.

First, referring to FIGS. 9A and 9B, the control of the display form of the VD index picture according to the size of the browser screen displayed on the display apparatus 32 of the terminal device 4 will now be described. Each of the diagrams shows the browser screen in FIG. 4 which is simplified. In the browser screen, only the part corresponding to the index display area 102 in FIG. 4 is shown. Each of the diagrams shows an example in which four VD index picture groups 111, 112, 113, and 114 are displayed in the index display area in the screen. In each of the diagrams, it is assumed that the maximum area in the vertical direction used to display one VD index picture group has two rows (two VD index pictures). However, the maximum area in the vertical direction used to display one VD index picture group is not limited to two rows.

First, it is assumed that the display screen for showing the retrieval result displayed first is in a display form as shown in FIG. 9A. That is, In FIG. 9A, the VD index picture groups 111, 112, 113, and 114 are displayed in the index display area in the screen. The VD index picture groups 111 and 113 are VD index picture groups corresponding to relatively long moving pictures. Each of the groups 111 and 113 is displayed by using the whole displayable area used to display one VD index picture group. The VD index picture group 114 is a VD index picture group corresponding to a moving picture shorter than the VD index picture groups 111 and 113. The first row of the group 114 is displayed by using all of the displayable area in the lateral direction. The second row is displayed by using a part of the displayable area. The VD index picture group 112 is a VD index picture group corresponding to a moving picture shorter than the VD index picture group 114 and is displayed by partially using the displayable area of the first row.

FIG. 9B shows a display form in the case where the size of the browser screen is increased in the lateral direction from the state of FIG. 9A. In this case, since the size of the browser screen is increased in the lateral direction, the number of VD index images which can be displayed in the lateral direction increases. In the embodiment, according to a change in the number of VD index pictures which can be displayed, the display form of each VD index image group changes. That is, in the example of FIG. 9B, with respect to the VD index picture groups 111 and 113, the number of VD index pictures displayed in the lateral direction increases as compared with the state of FIG. 9A. With respect to the VD index picture group 112, since the displayable area in the first row is partially used in the state of FIG. 9A, even when the size of the browser screen is increased in the lateral direction, the display form is not changed. With respect to the VD index picture group 114, all the VD index pictures can be displayed only in the first row.

As described above, in the embodiment, the proper number of VD index pictures can be displayed according to the size of the browser screen. The display form described above is determined by the index related process unit 75 in the web server 3.

Referring to FIG. 10, the control of the display form of the VD index picture according to the length of the moving picture will be described. The diagram shows in a simplified manner that a plurality of VD index pictures 121 are displayed in the index display area 102 on the browser screen. In the diagram, numerals in each of the VD index pictures 121 show the number of the display position of the VD index picture in the index display area 102. n (integer) in the number of the display position corresponds to the maximum number of the VD index pictures which can be displayed in the index display area 102.

In the embodiment, for example, when the length of the moving picture is within X (such as 1 minute), the display form is determined so as to display the VD index pictures in the area of No.1 to No.2. For example, when the length of the moving picture is within a range from X to Y (such as from 1 minute to 3 minutes), the display form is determined so as to display the VD index pictures within the area of No.1 to No.2. For example, when the length of the moving picture is Y or longer (such as 3 minutes or longer), the display form is determined so as to display the VD index pictures in the area up to No.(n), that is, the maximum display number of the VD index pictures which can be displayed in the index display area 102.

When the VD index pictures 121 are displayed up to the position of the number (n), it is therefore known that the length of the moving images is Y or longer. When the VD index pictures 121 are displayed to the position of the number n−1, it is known that the length of the moving pictures is in the range from X to Y. When the VD index pictures are displayed only to the position of the number 1 to n−2, it is known that the length of the moving pictures is within X.

As described above, in the embodiment, only by seeing the number of the VD index pictures displayed on the browser screen, an approximate length of the moving pictures can be grasped.

The value X or Y of time as a reference of setting the display number of the VD index pictures may be determined, for example, based on the distribution of the time length of all the moving pictures in the database server 6. It is preferable to adopt the time length at or near the peak of the distribution as the value X and Y. The X and Y values may be fixed values as long as there is no change in the distribution of the lengths of the moving images in the database server 6. When there is a change in the distribution of the lengths of the moving pictures, it is desirable to change the value in accordance with the change in the distribution. Consequently, the VD index pictures can be optimally displayed according to the tendency of the distribution of the lengths of the moving pictures in the database server 6. The display form described above is determined by the web server 3.

Figure 11:
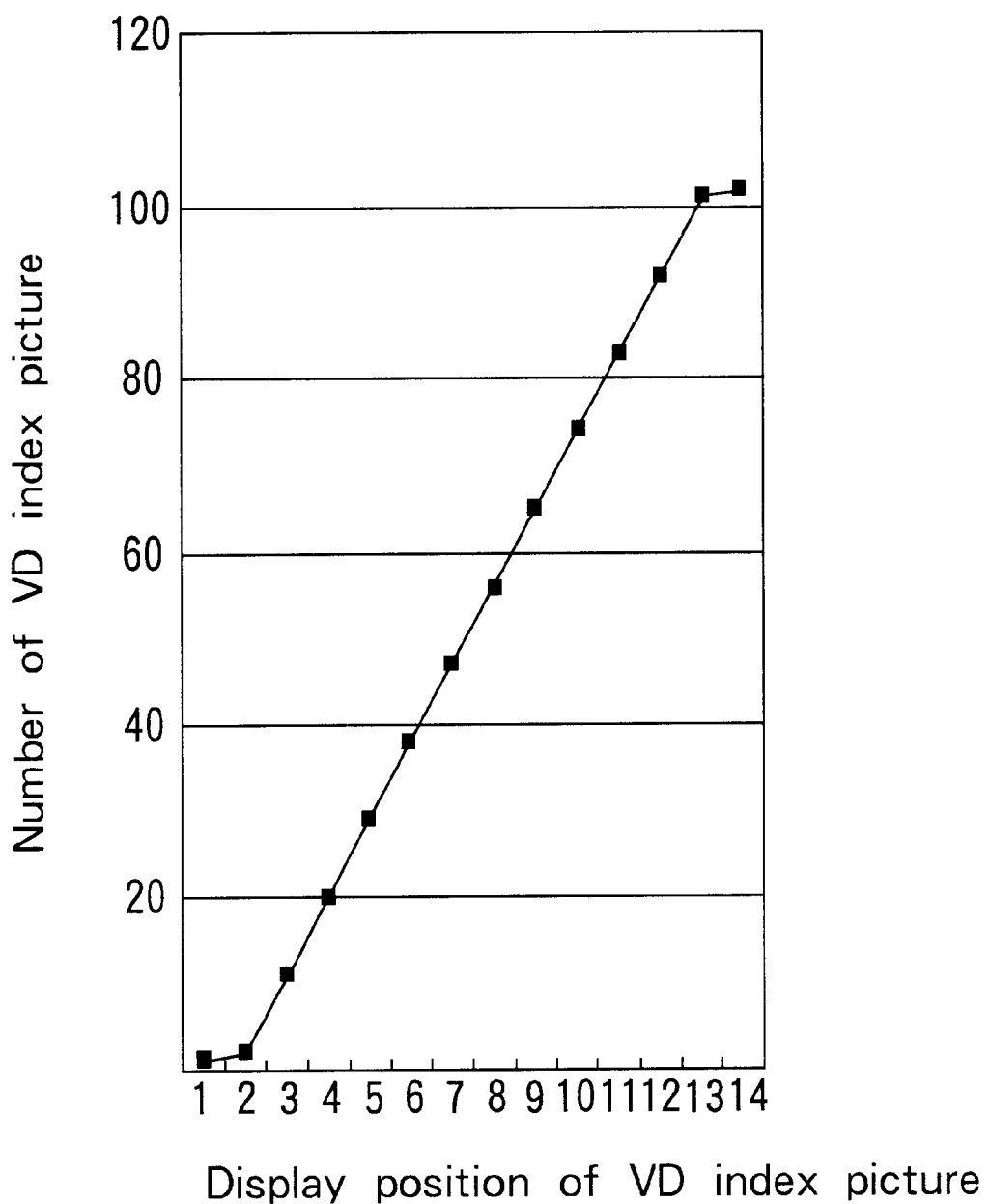
FIG. 11 is an explanatory diagram showing a method of selecting a VD index picture.
Figure 12:
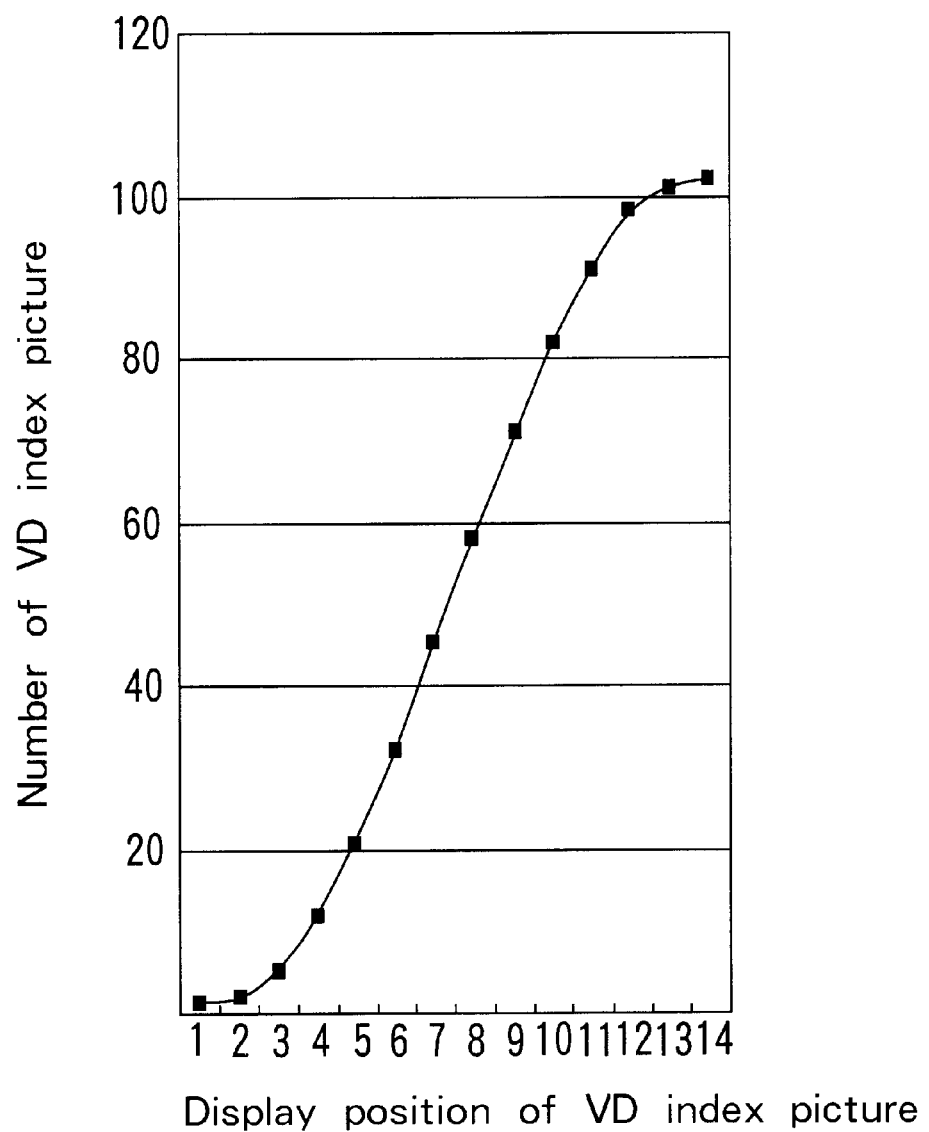
FIG. 12 is an explanatory diagram showing the selecting method shown in FIG. 11 with an example in which an approximation with a cubic function is used.

Referring to FIGS. 11 and 12, the method of selecting the VD index pictures to be actually displayed among the generated VD index pictures will now be described. In FIGS. 11 and 12, the lateral axis denotes the display position of the VD index picture and the vertical axis denotes the number of the VD index picture. In the embodiment, when the number of the VD index pictures generated exceeds the number of the VD index pictures to be actually displayed, the VD index pictures generated are partly weighted by using a predetermined function and the VD index pictures to be actually displayed are selected. The selection of the VD index images here denotes a process of selecting the numbers of the VD index pictures in practice.

As a method of selecting the VD index pictures, for example, there is a method of sampling the generated VD index pictures at a constant interval along the time-axis irrespective of the contents of the moving pictures and reducing the number of the pictures to the number of VD index pictures to be actually displayed. However, when the VD index pictures generated are simply sampled at a constant interval along the time base, there is the possibility that a scene which seems to be important in the moving picture is lost and is not displayed. According to the embodiment, in consideration of a scene which seems to be important in the moving picture, the VD index pictures are selected.

An example of the method of selecting the VD index pictures in consideration of the scene which seems to be important in the moving picture is a method as shown in FIG. 11. In FIG. 11, the numbers of the VD index pictures corresponding to the parts shown by "■" are numbers of the VD index pictures actually displayed. In the diagram, for example, the VD index picture of number 1 is therefore displayed in the display position of number 1.

In the example of the diagram, it is considered that the important scenes are included in the beginning and end portions of the moving picture and the VD index pictures corresponding to the beginning and end portions of the moving picture are always included in the pictures to be displayed. More specifically, the VD index pictures of the first two and last two numbers are weighted and selected as the numbers of which pictures are always displayed. With respect to the VD index pictures corresponding to the intermediate portion of the moving picture, a process of simply sampling the pictures at a constant interval along the time axis is performed.

FIG. 12 is obtained by approximating the selecting method shown in FIG. 11 with a cubic function. The cubic function shown in the diagram is expressed by the following equation (1). In the following equation (1), "total" denotes the total number of VD index pictures generated and "view" indicates the number of VD index pictures to be displayed. (x) denotes a display position of the VD index picture and (y) denotes the number of the VD index picture actually displayed. "round" indicates a function of round-off.

$$y = \text{round}\,[-2(\text{total} - \text{view})x^3/(\text{view} - 3)^3 + \\ 3(\text{total} - \text{view})(\text{view} + 1)x^2/(\text{view} - 3)^3 + \\ \{(\text{view} - 3)^3 - 12(\text{total} - \text{view})(\text{view} - 1)x/(\text{view} - 3)^3\} + \\ 4(\text{total} - \text{view})(3\,\text{view} - 5)/(\text{view} - 3)^3] \quad (1)$$

The function used for the weighting is not limited to the equation (1) but other functions may be used. Although the weight is assigned to the beginning and end parts of the moving picture in the above description, the weight may be assigned to an arbitrary position other than the beginning and end parts of the moving picture. It is desirable to assign the weight to the position of a scene which seems to be important in the moving picture.

The described process of selecting the VD index pictures is performed by the index related process unit 75 in the web server 3.

The above described processes of the control of the display form of the VD index pictures in accordance with the size of the browser screen, the control of the display form of the VD index pictures in accordance with the length of the moving picture, and selection of the VD index pictures accompanying those controls of the display form will be described along the flowchart of FIG. 13.

Figure 13:
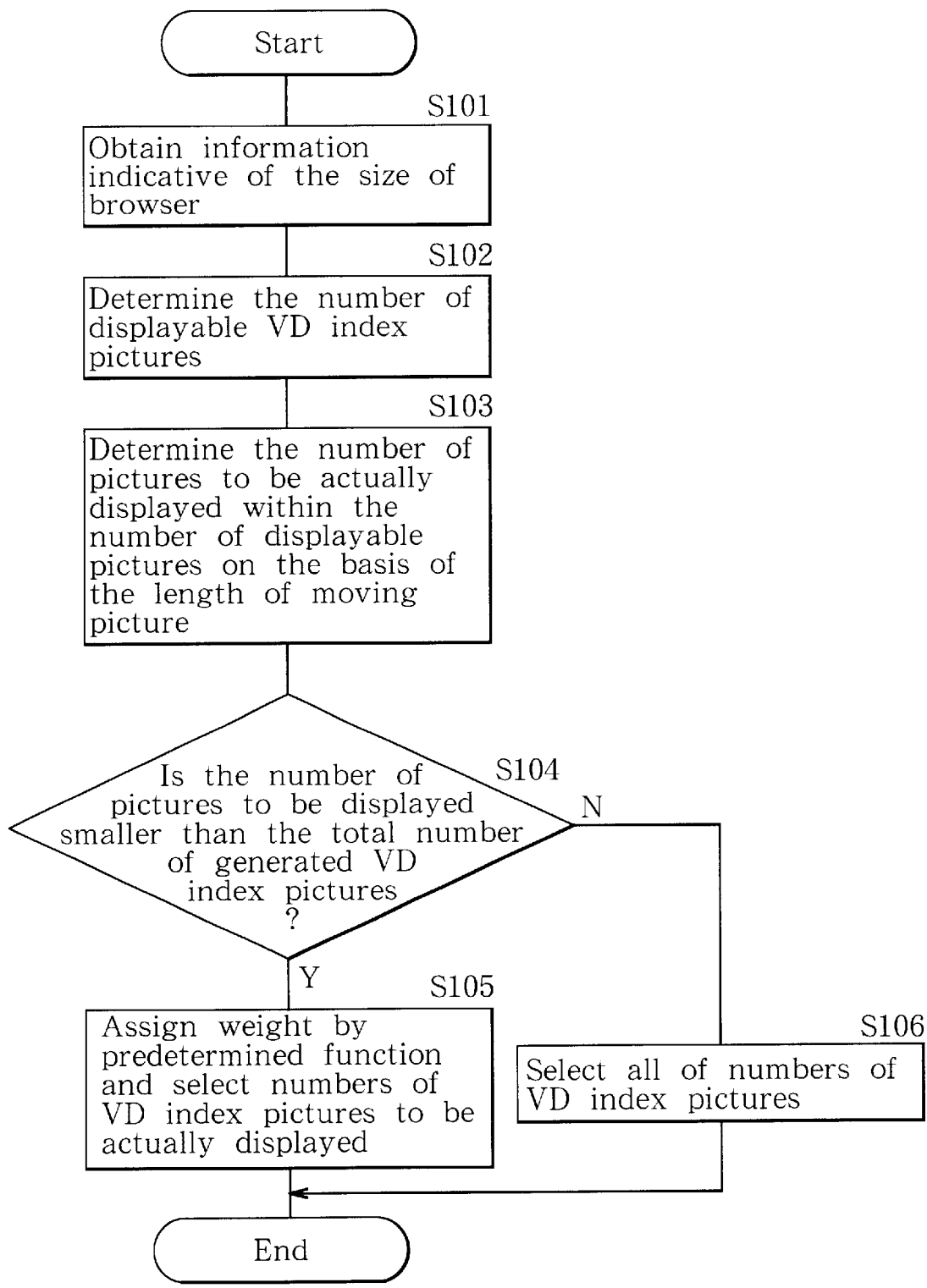
FIG. 13 is a flowchart showing an operation of displaying the VD index pictures.

FIG. 13 is a flowchart showing the operation of controlling the display form of the VD index pictures. The index related process unit 75 in the web server 3 obtains information indicative of the size of the browser screen displayed on the display apparatus 32 of the terminal device 4 (step S101). For simplicity of explanation, the control of the display form in the case of obtaining information only in the lateral direction of the screen as the size of the browser screen and displaying one VD index picture group only in one row will be described. The index related process unit 75 determines the number of VD index pictures which can be displayed on the browser screen in the terminal device 4 on the basis of the obtained information indicating the size of the browser screen (step S102).

Then the index related process unit 75 obtains the information of the length of the retrieved moving picture from the retrieval result of the database server 6 and, based on the obtained information, determines the number of VD index pictures to be actually displayed on the browser screen within the number of VD index pictures which can be displayed (step S103).

The index related process unit 75 determines whether or not the number of VD index pictures to be actually displayed on the browser screen is smaller than the total number of the VD index pictures generated (step S104). When the number of the VD index pictures to be displayed is smaller than the total number of the VD index pictures generated, for example, the index related process unit 75 assigns weights on the numbers of the VD index pictures corresponding to the beginning and end portions of the moving picture by a predetermined function as shown by the equation (1) and selects the numbers of the VD index pictures to be actually displayed (step S105). When the number of VD index pictures to be displayed is not smaller than the total number of the VD index pictures generated (N in step S104), the index related process unit 75 selects all of the numbers of the VD index pictures generated as numbers of the VD index pictures to be actually displayed (step S106).

The index related process unit 75 transfers the information of the numbers of the VD index pictures to be actually displayed, which is determined as mentioned above, to the GUI data generating unit 77. The GUI data generating unit 77 generates the GUI data on the basis of the retrieval result from the database server 6, the retrieval result of the index storing unit 74, and the information of the numbers of the VD index pictures to be actually displayed which are determined by the index related process unit 75. The GUI data generating unit 77 stores the generated GUI data into the GUI data storing unit 78 and transmits it as the retrieval result to the terminal device 4. The terminal device 4 receives the GUI data transmitted from the web server 3 and, on the basis of the data, displays the VD index pictures in the index display area 102 on the retrieval result display screen as shown in FIG. 4.

As described above, the display form of the VD index pictures to be displayed is optimally controlled according to the display environment of the browser screen displayed on the display apparatus 32 of the terminal device 4 and the contents of the moving pictures (information of the length of the moving picture and the position of the scene which seems to be important).

As described above, according to the embodiment, since the display format of the index is determined according to the length of the moving picture, by seeing the display format of the VD index pictures, the length of the moving picture can be grasped to a certain degree.

When all of the VD index pictures generated cannot be displayed, the VD index pictures to be actually displayed are selected in consideration of the scene which seems to be important in the moving picture. Consequently, the VD index pictures in the scene which seems to be important can be efficiently displayed in a small display area. Even when all the VD index pictures are not displayed, the outline of the moving pictures can be grasped.

Further, since the number of the VD index pictures to be displayed is changed according to the size of the browser screen, even when the size of the browser screen is changed according to the environment, object, or the like, the VD index pictures can be displayed always in a state optimum for the size of the browser screen.

Although the invention has been described by the embodiment, the invention is not limited to the embodiment but can be variously modified. For example, the display form of the VD index pictures each of which is generated by joining a part of each of a plurality of still pictures arranged in time sequence so as to construct a moving picture has been described in the foregoing embodiment. The invention can be also applied to the case where any of a plurality of still pictures is extracted and used as an index picture.

Although the index generating unit 87 is disposed in the moving picture server 5 in the embodiment, it can be disposed in the web server 3. It is also possible to use the index generating unit 87 as an independent server and connect it to the network 2.

In the embodiment, the index storing unit 74, still picture storing unit 79, moving picture storing unit 85 or index related information storing unit 76, and the display apparatus 32 as display means and the Internet browser unit 81 are disposed so as to be dispersed to the web server 3, moving picture server 5 and terminal device 4 and the components are connected to each other via the network 2. Alternatively, all the components can be provided in a single apparatus as a standalone image display apparatus.

As described above, in the image display apparatus according to any one of claims 1 to 7 or the image displaying method according to any one of claims 8 to 14, an index image generated by summarizing a moving picture as a still picture on the basis of a plurality of still pictures arranged in time sequence so as to construct the moving picture is held and a display form of the index picture to be displayed on the display means is determined in accordance with at least one of display environment of the display means for displaying the held index picture and the contents of the moving picture. Consequently, an effect such that the index picture generated by the video browser technique can be properly displayed according to the display environment, the contents of the moving picture, and the like is produced.

Especially, in the image display apparatus according to claim 3 and the image displaying method according to claim 10, a display form of the index image is determined so as to display index pictures of the number according to the length of the moving picture. An effect such that, for example, only by seeing the number of displayed index pictures, the length of the moving picture can be grasped to a certain degree is produced.

Particularly, in the image display apparatus according to claim 4 or the image displaying method according to claim 11, a display form of the index picture is determined in accordance with the size of a display area for displaying the index picture in the display means so as to display an optimum number of index pictures in the display area. An effect such that, for example, even in the case of changing the size of the display area in accordance with the environment, the purpose, or the like, the index pictures can be displayed always in the state optimum to the size of the display area is produced.

Particularly, in the image display apparatus according to any one of claims 5 to 7 or the image displaying method according to any one of claims 8 to 12, an index picture to be displayed is selected from the index pictures held in accordance with at least one of the display environment of the display means and the contents of the moving picture and a display form of the index picture is determined so that only the index picture to be displayed is displayed on the display means. Consequently, the following effect is produced. For example, by selecting the picture to be actually displayed in consideration of a scene which seems to be important, the index picture of the scene which seems to be important can be efficiently displayed in a small display area and the outline of the moving picture can be grasped without displaying all of the index pictures.

Obviously many modifications and variations of the present invention are possible in the light of the above teachings. It is therefore to be understood that within the scope of the appended claims the invention may be practiced otherwise than as specifically described.

What is claimed is:

1. An image display apparatus characterized by comprising:

index picture holding means for holding a plurality of index pictures generated by summarizing a moving picture as a still picture on the basis of a plurality of still pictures arranged in a time sequence so as to construct the moving picture;

display form determining means for determining a certain number of index pictures that are to be displayed on display means in accordance with at least either a display environment of the display means or the contents of the moving picture; and selection means for selecting index pictures from the plurality of index pictures held by the index picture holding means using a predetermined function based on the location of the index picture within the moving picture, whereby the selected index pictures are selected in accordance with the number of index pictures determined by the display form determining means;

wherein the selection means assign a weight on index pictures corresponding to at least the beginning or ending part of the moving picture so that the index pictures corresponding to at least the beginning or ending part of the moving picture are displayed more preferentially than the index pictures in the other part, and selects index pictures to be displayed.

2. The image display apparatus according to claim 1, wherein the index picture holding means holds an index picture generated by combining a part of each of the plurality of still pictures arranged in time sequence so as to construct the moving image.

3. The image display apparatus according to claim 1, wherein the display form determining means determines a display form of the index picture so as to display a certain number of index pictures according to the length of the moving picture.

4. The image display apparatus according to claim 1, wherein the display form determining means determines a display form of the index picture in accordance with the size of a display area for displaying the index picture in the display means so as to display an optimum number of index pictures in the display.

5. The image display apparatus according to claim 1, wherein the selection means selects an index picture to be displayed from the index pictures held by the index image holding means in accordance with at least either the display environment of the display means or the contents of the moving picture, and the display form determining means determines a display form of the index picture so that only the index picture to be displayed is displayed on the display means.

6. The image display apparatus according to claim 5, wherein the selection means weights an index picture including a picture which seems to be important so that the index picture including the image which seems to be important is displayed more preferentially than index pictures in the other part, and selects index pictures to be displayed.

7. An image display method characterized by comprising the steps of:

holding a plurality of index pictures generated by summarizing a moving picture as a still picture on the basis of a plurality of still pictures arranged in a time sequence so as to form the moving picture;

determining a certain number of index pictures that are to be displayed on display means in accordance with at least either a display environment of the display means for displaying the held index pictures or the contents of the moving picture; and selecting index pictures from the plurality of index pictures held in the holding step using a predetermined function based on the location of the index picture within the moving picture, whereby the selected index pictures are selected in accordance with the number of index pictures determined by the determining step;

wherein index pictures corresponding to at least the beginning or ending part of the moving picture are weighted so as to be displayed more preferentially than index pictures of the other part, and the index picture to be displayed is selected.

8. The image displaying method according to claim 7, wherein an index picture is generated by combining a part of each of a plurality of still pictures arranged in time sequence so as to construct the moving image.

9. The image displaying method according to claim 7, wherein a display form of the index picture is determined so as to display a certain number of index pictures according to the length of the moving picture.

10. The image displaying method according to claim 7, wherein the display form of the index picture is determined so that the index pictures of an optimum number are displayed in the display area in accordance with the size of the display area for displaying the index picture in the display means.

11. The image displaying method according to claim 7, wherein the index picture to be displayed is selected from the held index pictures in accordance with at least either a display environment of the displaying means or the contents of the moving picture, and a display form of the index images is determined so that only the index images to be displayed are displayed on the display means.

12. The image displaying method according to claim 11, wherein an index picture including a picture which seems to be important is weighted so as to be displayed more preferentially than index pictures in the other part, and the index picture to be displayed is selected.

* * * * *